(No Model.)  
6 Sheets—Sheet 2.
J. RICHARDS.
PNEUMATIC MACHINERY.
No. 249,996.  Patented Nov. 22, 1881.
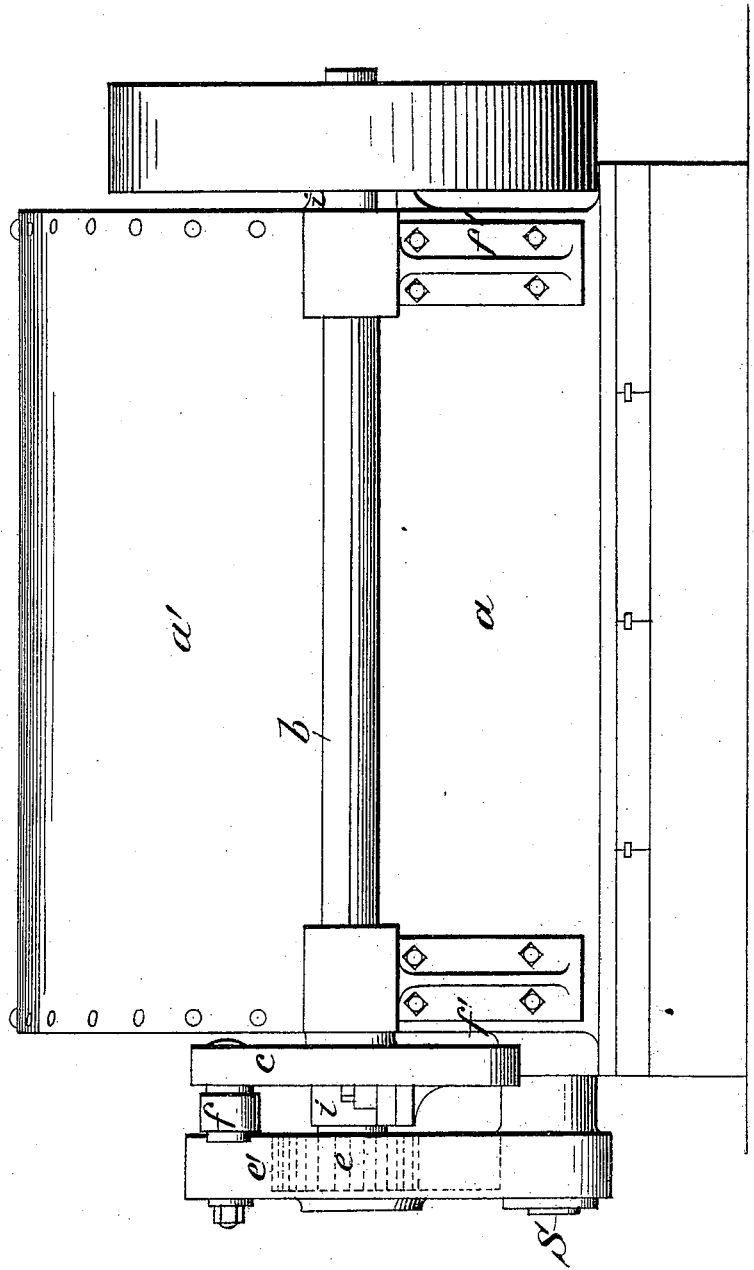

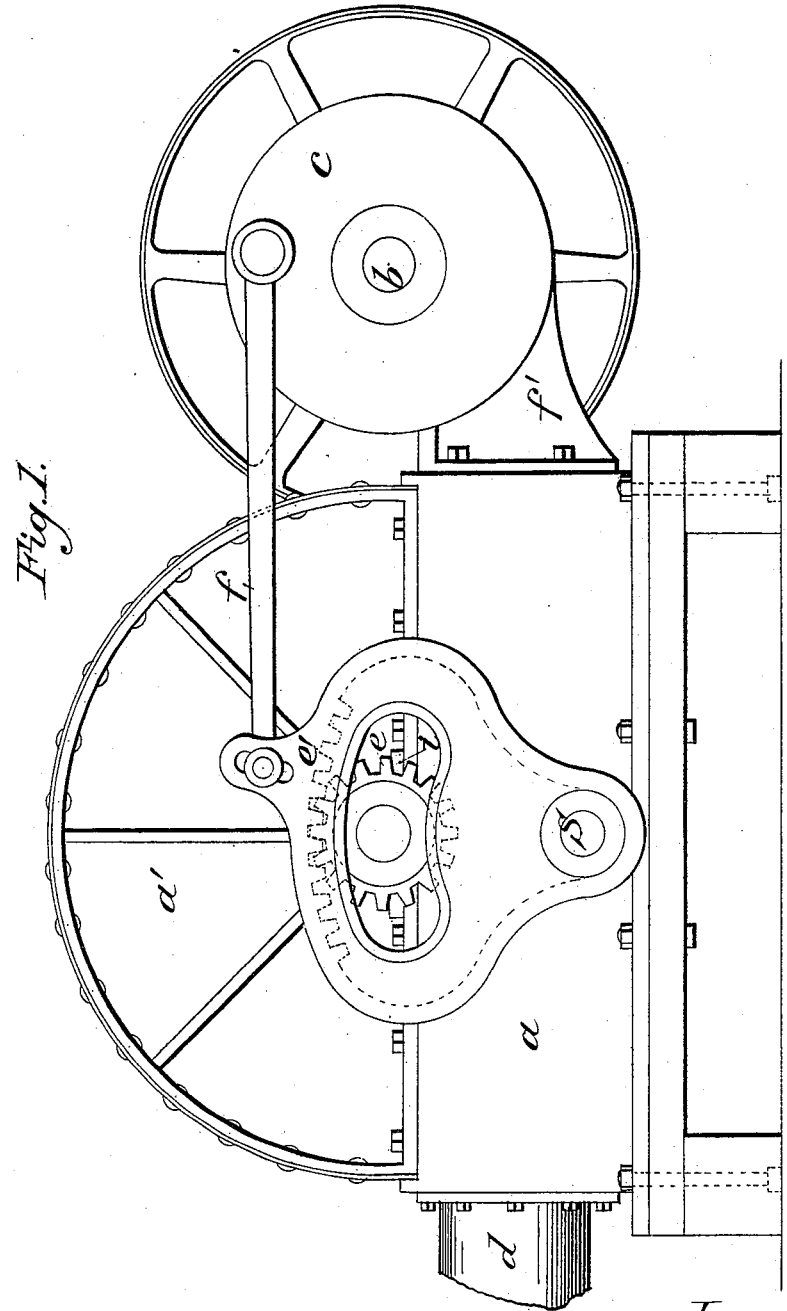

(No Model.) 6 Sheets—Sheet 3.

J. RICHARDS.
PNEUMATIC MACHINERY.

No. 249,996. Patented Nov. 22, 1881.

(No Model.)

6 Sheets—Sheet 4.

J. RICHARDS.
PNEUMATIC MACHINERY.

No. 249,996.

Patented Nov. 22, 1881.

Attest:
F. H. Schott
A. R. Brown

Inventor:
John Richards
by J. C. Tasker,
atty.

N. PETERS, Photo-Lithographer, Washington, D. C.

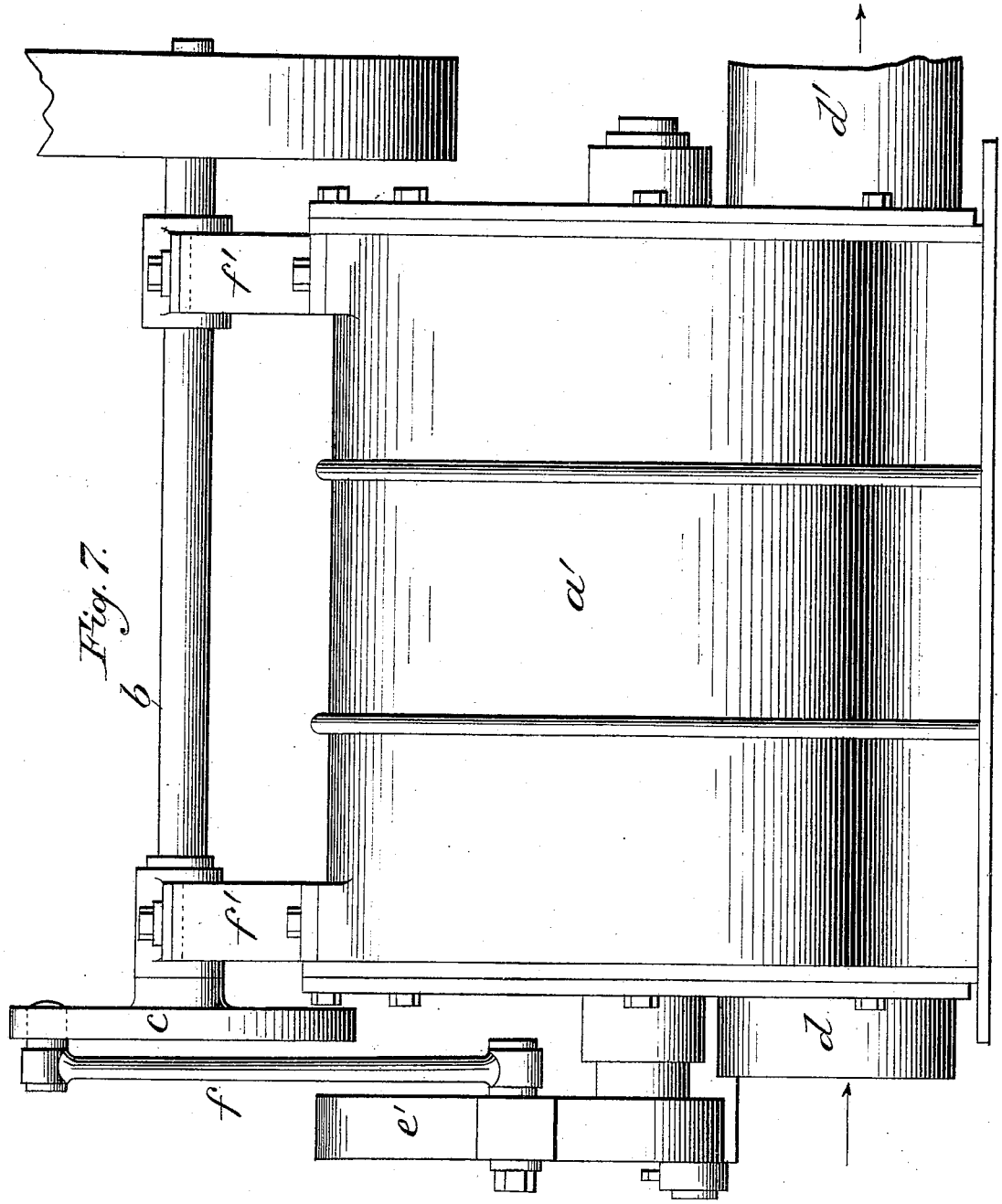

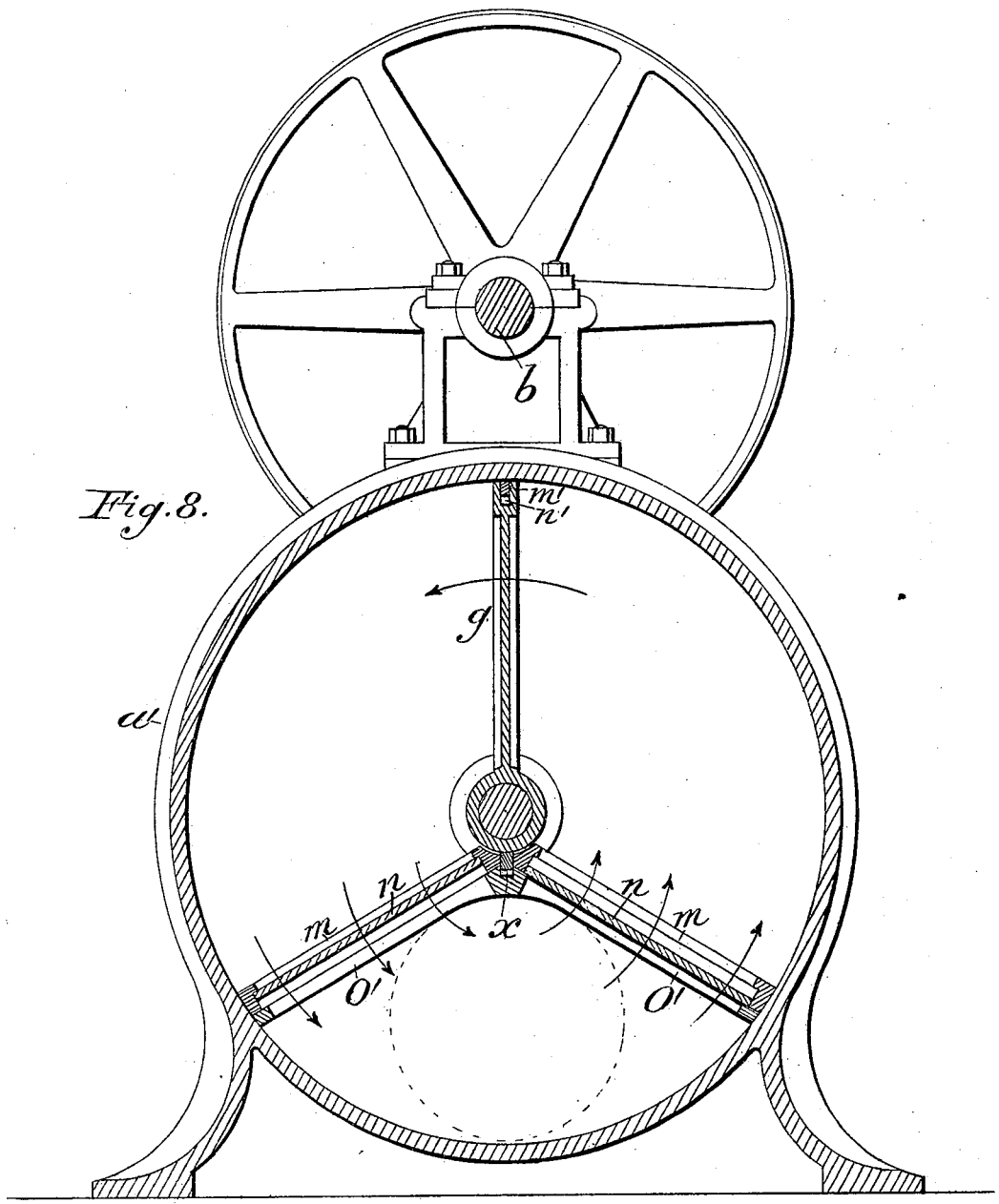

UNITED STATES PATENT OFFICE.

JOHN RICHARDS, OF SAN FRANCISCO, CALIFORNIA.

PNEUMATIC MACHINERY.

SPECIFICATION forming part of Letters Patent No. 249,996, dated November 22, 1881.

Application filed May 3, 1881. (No model.)

*To all whom it may concern:*

Be it known that I, JOHN RICHARDS, a citizen of the United States, residing at San Francisco, in the county of San Francisco and State of California, have invented certain new and useful Improvements in Pneumatic Machinery; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

This invention relates to machinery especially intended for compressing or forcing air where low pressures are required, as in furnishing air to furnaces for combustion, ventilating mines and buildings, and so on; and it consists, essentially, in the employment of an oscillating vane or piston operating through the arc of a circle, inclosed by a suitable casing and put in motion by a pinion, segment, and crank-wheel, as will be hereinafter fully described.

It consists also in the employment of rectangular grated valves or frames to stop or permit the ingress or egress of air to the chamber in which the vane or piston operates.

Figure 5:
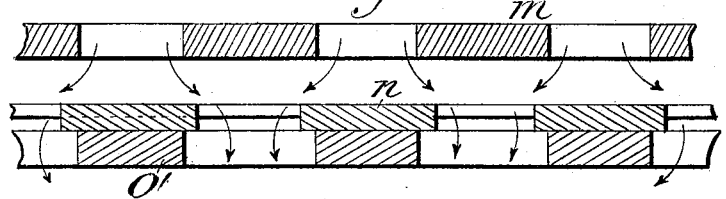
Figure 6:
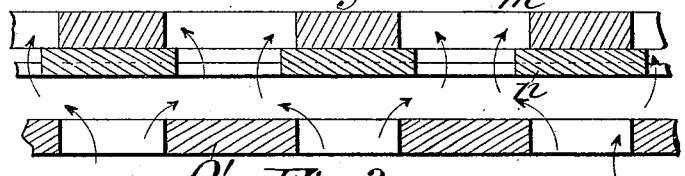
Figure 3:
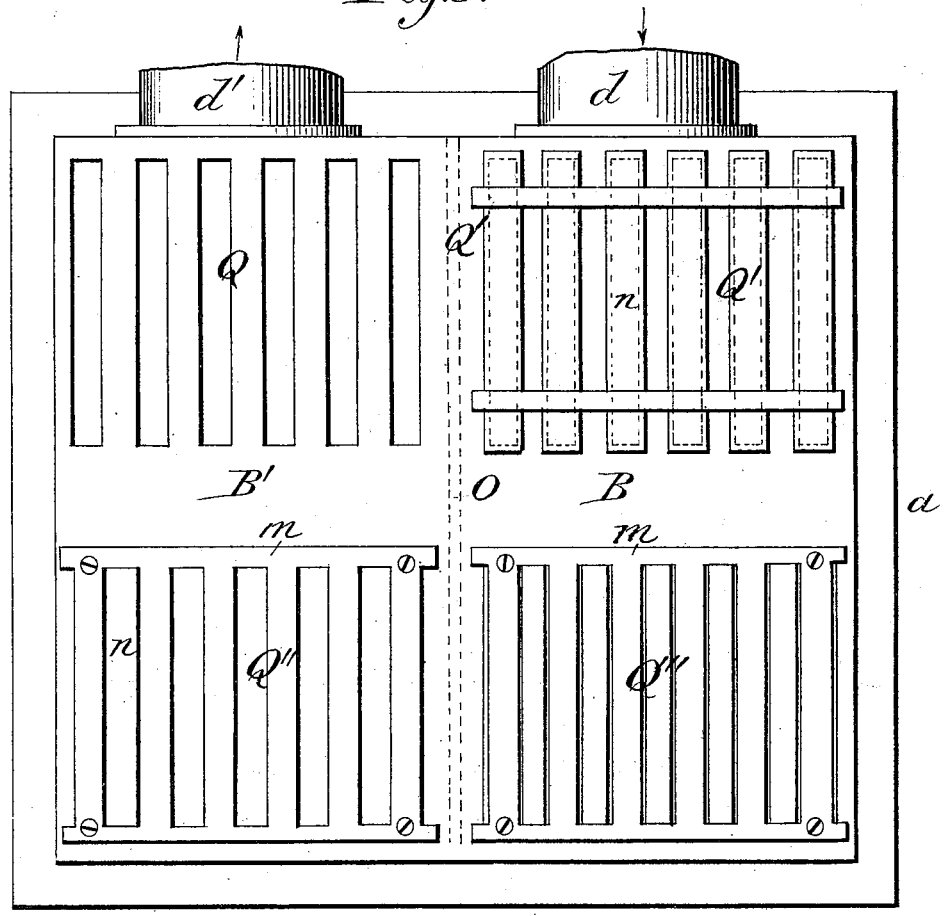
Figure 9:
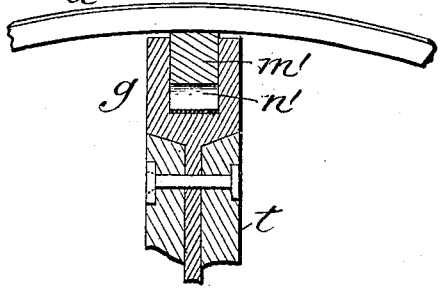
Figure 4:
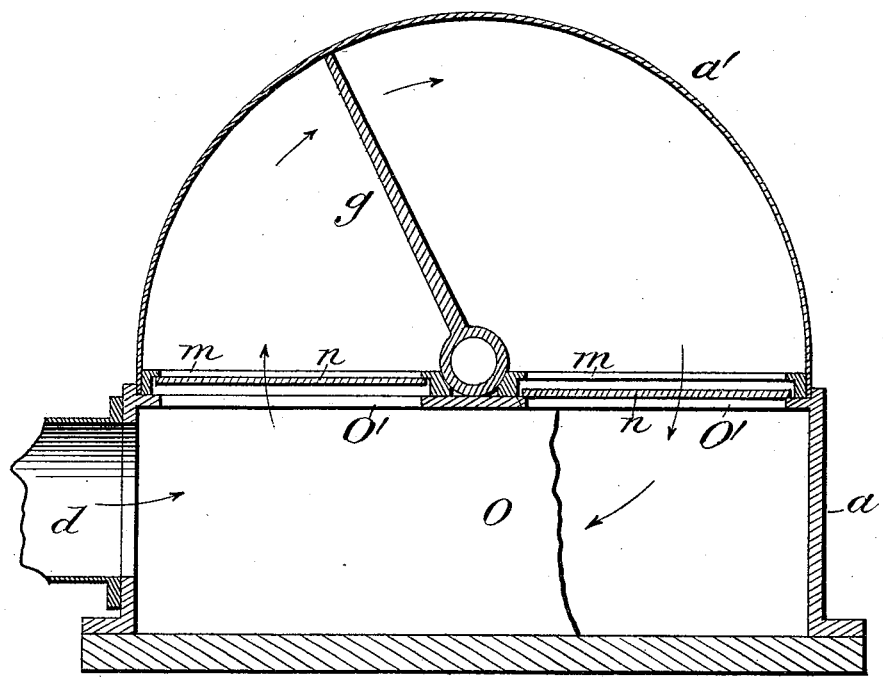

In the drawings, Figure 1 is an end view of one of my machines, in which the vane or piston performs a half revolution. Fig. 2 is a side view of the same machine. Fig. 3 is a top view of the main frame, showing the air-ports, valve-frames, and valve-covers. Fig. 4 is a transverse section through Figs. 1 and 2, showing the piston-valves and other details. Figs. 5 and 6 are enlarged sections through the eduction and induction valves, showing the course of the air and the manner of its inlet and exit. Fig. 7 is a side view of a modification, showing a machine arranged with a vane or piston to move through two-thirds of a circle, otherwise constructed on the same general plan as the machine shown in Figs. 1 and 2. Fig. 8 is a transverse section through the middle of Fig. 7, showing the piston-valve, frames, and other details. Fig. 9 is a detail of the piston or vane, showing the manner of packing its periphery.

Referring, now, to the drawings, from Figs. 1 to 6, $a$ is the main frame, on which is supported the various details constituting the complete machine, also forming an air chamber or receiver. This frame is divided transversely into two compartments or chambers by a diaphragm or cross-division, O. (Shown in dotted lines in Fig. 3, and at O, Fig. 4.) On one side of this division, at B, Fig. 3, is the induction-chamber, into which the air is drawn through the pipe or inlet $d$. On the other side of the division O is the eduction-chamber B', into which the air is forced before it escapes through the outlet-pipe $d'$. To this frame is attached a housing, $a'$, forming the chamber within which operates the vane or piston $g$. This vane or piston has journals that project through the bearings $i\ i$, Fig. 2, upon which it oscillates. On the end of one or both of these journals are placed pinions $e$. Engaging these pinions are oscillating segmental racks supported on studs S. The racks $e'$ are driven by connecting-links $f$ from crank-wheels $c$, supported upon brackets $f'$, attached to the air-chamber, so that by a complete revolution of the shaft $b$, revolving in suitable bearings on the brackets, the pinion and piston $g$ will make a half revolution each way, alternately drawing in and expelling the air through the chambers B and B'. When the duty to be performed is heavy driving-gearing is applied at both ends, the pulley $b$ in that case being placed between the brackets $f'\ f'$.

The valves $n$, Figs. 3, 4, 5, and 6, are composed of wood or other light material arranged in bars with cross-girts, as shown at Q', Fig. 3. Over the top of these valves or frames are placed suitable covers or plates to keep them in position and regulate the range of movement the same as in the case of gridiron-valves for water or other uses.

Fig. 3, which is a top view of the main frame $a$, with the housing $a'$ removed, shows one set of ports bare.

At Q' is shown a valve-frame covering the ports, while at Q'' and Q''' the housings or guard-plates are shown in place and covering the valve-frames.

Q and Q'' are eduction-ports, the valve-frames rising against the housing $m$ and preventing the ingress of air. This will be better understood by reference to Fig. 5, where the valves are shown wide open.

Q' and Q''' are the induction-ports through which the air enters, the valve-frames n in this case shutting down over the ports in the main frame, as shown in the enlarged views at Figs. 5 and 6.

Referring, now, to the operation of the machine, let it be supposed that the vane or piston g, Fig. 4, is moving in the direction indicated by the arrows, then the induction-valves corresponding to Q' and Q''' will assume the position shown in Fig. 6, the air rushing in, as indicated by the arrows, while one of the eduction-valves would assume the position shown in Fig. 5. The two valves acting simultaneously would, for example, be alternately at diagonal corners Q and Q''' or Q' and Q'', the air in the chamber being in both cases expelled.

Referring to Figs. 7, 8, and 9, which show a modification of my machine, the same in principle and in devices for driving, admitting, and expelling the air, but with a piston or vane arranged to perform two-thirds instead of half a revolution. The main casing a' is a continuous or complete cylinder, and in that form is strong enough to permit the driving-shaft b to be placed on top, as shown.

The driving mechanism, consisting of a pinion, segmental rack, crank-wheel, connecting-rods and pulley, is the same as in Figs. 1 and 2, hence does not require separate description.

The valve-seats and frames are set diagonally, as shown in Fig. 8, the chamber beneath being divided into two parts by a cross-division, as in the previous case.

The induction and eduction pipes are placed at the ends or parallel to the axis of the vane, as shown at d and d', Fig. 7. The piston or vane is provided with adjustable packing at the periphery, as shown in Fig. 9.

m' is a bar of wood or metal inserted loosely in a groove, as shown. Beneath this bar is placed a metallic spring, n', serpentine in form, so as to press outward against the bar m' at several points, and thus make a close joint against the casing or housing. Similar packing can be applied to the ends of the vane or piston also below the axis, as shown at x, Fig. 8. To avoid weight I fill the piston with wood, as shown at t, Fig. 9.

These engines, although shown and described as for pneumatic purposes only, are, with unimportant modification, suited for raising or forcing water limited distances, the difference in the two cases being the relative mobility, elasticity, and weight of the fluids and their effect upon substances with which they come in contact.

Having thus described my invention, I claim as new and desire to secure by Letters Patent the following:

1. In a pneumatic engine, the combination of an induction and eduction chamber, and a piston or working-chamber forming an arc of a circle and separated from said induction and eduction chambers by grated valve-frames, in the manner described.

2. The oscillating segmental rack e', slotted to allow the adjustment of the connection f, and supported and oscillating upon stud s, attached to the base a, in the manner shown and described.

3. As a means of imparting motion to the oscillating vane or piston of a pneumatic engine, the combination of the pinions attached to the journals of said vanes or pistons with the oscillating segmental racks, adjustable connections f, and revolving crank-wheels, arranged and operating in the manner specified.

4. In a pneumatic engine, the brackets f', attached to the air-chamber or housing, and carrying the driving-shaft and crank-wheels, which impart motion to the vane or piston g, substantially as set forth.

5. The combination of the oscillating vane or piston g, double inclined and grated valve-frames o', slotted frame-plate m, and grated valves n, all constructed, arranged, and operating as and for the purpose described.

In testimony whereof I affix my signature in presence of two witnesses.

JOHN RICHARDS.

Witnesses:
GEO. A. ALDRICH,
MICHAEL J. BARRY.